June 8, 1965 E. LENSE 3,187,935
VENTING DEVICE FOR FUEL TANKS
Filed Oct. 9, 1962
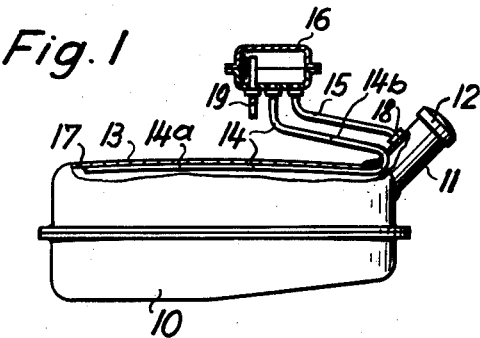
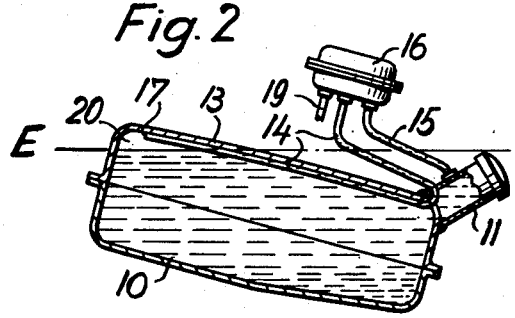
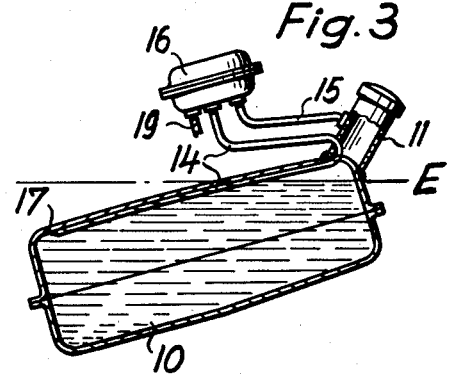
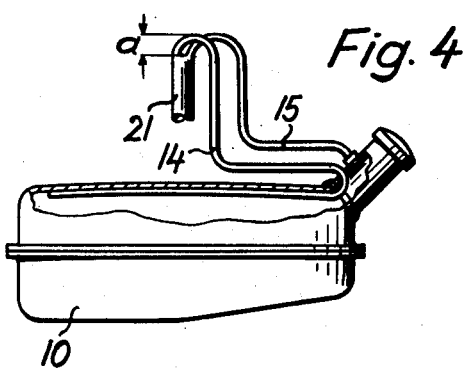
INVENTOR
EUGEN LENSE
BY Dicke & Craig
ATTORNEYS

United States Patent Office 3,187,935
Patented June 8, 1965

3,187,935
VENTING DEVICE FOR FUEL TANKS
Eugen Lense, Stuttgart, Germany, assignor to Daimler-Benz Aktiengesellschaft, Stuttgart-Unterturkheim, Germany
Filed Oct. 9, 1962, Ser. No. 229,400
Claims priority, application Germany, Oct. 12, 1961, D 37,222
2 Claims. (Cl. 220—86)

The present invention relates to a venting device for fuel tanks, especially of motor vehicles.

It is already conventional to provide fuel tanks, for example, of motor vehicles, with vent pipes to permit the tank to be easily filled and emptied by allowing the air which is displaced by the fuel to escape through the vent pipe to the outside or the consumed fuel to be replaced in the tank by air.

The venting devices which are known for this purpose have, however, the disadvantage that frequently some of the fuel emerges from the vent pipe, thereby soiling the vehicle and increasing the rate of fuel consumption as well as the danger of fire or explosion.

This undesirable occurrence is especially noticeable when the fuel within the tank becomes heated so that it is partly vaporized or gasified. The gas bubble which then forms increases the pressure head in the tank and forces an amount of fuel out of the vent pipe which depends upon the position of the car. This also applies especially during a longer uphill drive when heated fuel flows back into the tank whereby sometimes a very strong gas bubble is formed. This occurs especially when the vehicle is driven by a fuel injection engine in which the fuel is very quickly and strongly heated since it is quickly circulated due to the fact that the part of the fuel which is not required for the injection flows back from the engine into the tank and thereby heats the fuel in the tank very quickly. It is therefore especially noticeable in vehicles which are driven by diesel engines that a dirty spot forms underneath the cap of the tank.

However, even entirely independently of the heating of the fuel, it will often occur during uphill or downhill driving, and especially also when taking curves at a higher speed, that due to the centrifugal force some of the fuel will be forced out of the vent pipe.

It is an object of the present invention to overcome this disadvantage and it consists essentially in providing the fuel tank with a pair of vent pipes which terminate into the tank at or near the opposite ends thereof.

Since both ends of the fuel tank are then connected with the outer air, the tank will always be properly vented regardless of whether the vehicle is driving uphill or downhill and the fuel level is forwarly or rearwardly inclined in the tank relative to the vehicle. There is then no possibility for an air or gas bubble to form which by its pressure might force some of the fuel out of the vent pipes.

Before leading to the outside, the two vent pipes are preferably connected, for example, by terminating into a common collecting or compensating container which is preferably provided with an overflow above the point of entry of the vent pipes. If the vent pipes are properly placed and of the proper size, the collecting container may, however, also be omitted. It is furthermore of advantage to locate the free ends of the vent pipes at a point above the central area of the fuel tank so that, when the vehicle is in an upwardly or downwardly inclined position, the distance of these ends from the level of the fuel in the tank will be as equal as possible.

The features and advantages of the present invention will become more clearly apparent from the following detailed description of several preferred embodiments thereof as are illustrated in the accompanying diagrammatic drawings, in which—

FIGURE 1 shows a view of the inventive device when the fuel tank is in a horizontal position;

FIGURE 2 shows the fuel tank according to FIGURE 1 when it is tilted rearwardly;

FIGURE 3 shows the same fuel tank when tilted forwardly; while

FIGURE 4 shows a modification of the device without a collecting container.

As illustrated in FIGURES 1 to 3, the fuel tank 10 is provided with a filler pipe 11 which may be tightly closed by a cap 12 and with a slightly arched top wall 13. The upper part of the fuel tank carries two vent pipes 14 and 15 which terminate into a common collecting or compensating container 16. Vent pipe 15 branches off the filling pipe 11 at 18 at one end of tank 10, while vent pipe 14 branches off at 17 at the opposite end of the tank and leads at first by a section 14a along the top wall 13 of tank 10 and then by a second section 14b along the first vent pipe 15 and in the opposite direction to section 14a to the collecting container 16 which is located approximately above the central part of tank 10. The container 16 is provided with an overflow pipe 19 with an inner upper opening above the inlets of the vent pipes 14 and 15.

FIGURE 2 illustrates the fuel tank in an inclined position, for example, when a car in which it is installed is driving uphill. If at such an uphill drive or when the car is parked uphill, the volatile fuel becomes heated and starts to evaporate, a gas bubble 20 is formed in tank 10 which forces the fuel contained in vent pipes 14 and 15 upwardly into the collecting container 16. As soon as vent pipe 14 is again free of fuel and thus practically forms a connection between the gas bubble 20 and the outer air, the pressure in the gas bubble 20 immediately decreases with the result that, in accordance with the law of communicating tubes, the fuel contained in the container 16 and in vent pipe 15 flows back to the plane E—E of the liquid level. This procedure is currently repeated, especially if, when driving over a dip in the road or shortly uphill, the front opening 17 of vent pipe 14 is again immersed in the fuel and partly filled.

If the fuel tank 10 becomes inclined in the opposite direction, as shown in FIGURE 3, for example, when driving downhill, the procedure as described is reversed.

FIGURE 4 illustrates a simplified modification of the invention in which the two vent pipes 14 and 15 are not combined in a collecting container 16 but in a common end pipe 21 which is preferably relatively wide and extends, for example, through the trunk compartment. This embodiment has, however, the disadvantage over that according to FIGURES 1 to 3 that the amount of fuel which is forced out at the end pipe 21 is not collected and returned into the fuel tank 10. The amount of fuel which may thus be lost is, however, very small as compared with the loss which occurs from the conventional fuel tanks. This is true particularly if the vertical distance $a$ between the point of connection of the two vent pipes 14 and 15 and their highest point is relatively short. After a small amount of fuel is pushed like a plug equally upwardly in both vent pipes 14 and 15 by the excess pressure caused by the gas bubble in the tank, it starts to flow out into the end pipe 21 until the pressure is released through one of the vent pipes, whereby the liquid level also immediately drops in the other vent pipe.

Although my invention has been illustrated and described with reference to the preferred embodiments, thereof, I wish to have it understood that it is in no way limited to the details of such embodiments, but is capable of numerous modifications within the scope of the appended claims.

Having thus fully disclosed my invention, what I claim is:

1. A device for venting a fuel tank of a motor vehicle, said fuel tank having a filler pipe at one end thereof, said device comprising a pair of vent pipes, a collecting container disposed at a level above said filler pipe and approximately above the central part of said fuel tank, one of said pipes opening into and leading from the opposite end of said fuel tank alongside the upper wall thereof into said filler pipe and through a wall of said filler pipe to the interior of said container, the other of said vent pipes leading from the interior of said filler pipe to the said interior of said container.

2. A device for venting a fuel tank of a motor vehicle according to claim 1, further comprising an overflow pipe in said container having an inlet disposed at a level above said vent pipes.

References Cited by the Examiner

UNITED STATES PATENTS

| | | | |
|---|---|---|---|
| 932,026 | 8/09 | Keller | 222—479 |
| 2,357,626 | 9/44 | Arnold | 220—44 |
| 2,637,513 | 5/53 | Wallen | 220—86 |

FOREIGN PATENTS 801,325   5/36   France.

THERON E. CONDON, *Primary Examiner.*

EARLE J. DRUMMOND, *Examiner.*